Patented Nov. 15, 1932

1,887,905

UNITED STATES PATENT OFFICE

HANS-ADALBERT SCHWEIGART, OF KODITZ NEAR SAALFELD-SAALE, GERMANY

PROCESS FOR MAKING A FOOD SUBSTANCE FROM COCOA, SUGAR, AND WATER

No Drawing. Application filed June 23, 1931, Serial No. 546,415, and in Germany November 14, 1929.

According to one known process a chocolate beverage is made by heating a mixture of water and ground cocoa, or a mixture of water and chocolate instead, whereby the starch constituents of the cocoa become pasty; the pasty starch is then saccharified by any of the known means and the cooled liquid is separated from the fat particles and insoluble constituents. After the saccharification of the starch the liquid may also be subjected to a yeast fermentation and the clear liquid then separated from the fat and the insoluble constituents. The product is a clear liquid which does not deposit.

A less bothersome process is also known in which invert sugar syrup of particular composition is mixed with cocoa and this mixture is brought either nearly or completely to the boiling temperature for a shorter or longer time. By means of this process a chocolate material of paste-like quality is obtained. The process cannot be employed to make a homogeneous chocolate mixture which deposits no sediment.

In contradistinction to these known processes, a concentrated food substance is made by the new process forming the subject of this invention, from cocoa, sugar and water by heating the constituents, in such a manner that cocoa powder together with the aqueous solution of sugar is broken down with addition of acid, e. g. formic acid. The disintegration or breaking down process extends both to the starch as well as to the protein substances of the cocoa. In consequence of the heating of the acidified aqueous liquid the insoluble constituents are brought into a state of suspension, in which they remain even on long keeping; even when kept for a long time no solid sediment forms in the storage vessels.

In its simplest form the new process is as follows:

Thirty to 45 parts of sugar are dissolved in about 40 parts of water and 20 parts of cocoa powder from which the oil has been removed and, if necessary 5 to 10 parts of wheat flour as well, are added thereto; the mixture is acidified by addition of some acid, such as lactic acid, a fruit acid, or even by addition of a suitable mineral acid, such as phosphoric acid, or a mixture of such organic acids and mineral acids, which may be constituents of a food substance, and heated to about boiling temperature. The heating is continued until the protein substances present in the mixture are converted to a considerable extent by partial degradation into a favourable state of swelling in the liquid which is rich in soluble constituents (sugar) which prevents the deposition of the insoluble parts of the mixture. Soluble mineral salts may also be added to the mixture as well in the acidified aqueous liquid. The colloidal solution of the albumin substances in combination with the content of soluble substances in the liquid enables a state of suspension of the insoluble particles of the mixture to be attained for a long time, or for all time, which particles are softened by the heating in the acidified liquid and swollen.

One can also proceed by first of all dissolving the sugar (saccharose) in water and heating and inverting in presence of acid; after the sugar has inverted to a sufficient extent the powder-like food substances are introduced into the liquid and the mixture then further heated as stated above.

Experiments have shown that the best results are obtained with the new process if the minimum acid content of the heated mixture of aqueous liquid with powder-like constituents has an acidity of only 0,05 N.; as a rule the acidity will be somewhat higher, but the maximum acid content ought not to exceed, or ought not substantially to exceed, an acidity of about 0,15 normal. Any acid excess in the finished preparation is subsequently neutralized by alkalies or carbonates of the alkalies or oxide of lime, or magnesium oxide, or the corresponding hydroxides or carbonates or other acid-binding salts.

Very satisfactory results are obtained by first of all adding only a part of the necessary acid to the mixture of aqueous liquid with the powder-like constituents and thereupon heating until the favourable swelling state of the protein substances is attained; after cooling the mixture so treated to about 70° C. the rest of the acid is then added in order to convert the remainder of the colloidally soluble saccharides, more particularly the starch, as completely as possible into the state of solution. Any other constituents remaining unchanged as well, e. g. the cocoa red glucoside of the cocoa constituents, are also broken down hereby or still further degraded.

As an acid, formic acid is of advantage in the present process, because it enables the production of a finished product of raised stability.

If desired, the liquid product arising first of all may be converted by evaporation to the thickness of extract or even into the form of a powder, and may then be converted into the liquid state again each time before use by addition of water or aqueous liquid.

A paste or suspension of milk powder may be added to the mixture made according to the described process, if necessary before the boiling process serving for attaining the full effect aimed at is stopped. After intimate admixture of the two liquids the mixture is subjected to raised pressure and temperature such that casein and albumin substances go into solution from the milk powder and a liquid preparation is obtained in which neither the cocoa constituents nor the milk constituents form a sediment, even after a long time.

The paste or suspension of the milk powder in water, which may be made from skimmed milk powder or full milk powder, or else the mixture of the suspension or paste of the milk powder with the cocoa-sugar preparation which has been boiled for a long time is homogenized by means of any of the known devices suitable herefor prior to the last heating which takes place under raised pressure.

Cocoa paste may also be used instead of cocoa powder for making this concentrated chocolate milk.

The present process offers a very favourable possibility of usefully employing skimmed milk powder for making a readily digestible, pleasant tasting, foodstuff which is ready for use. The proportion of milk powder to the remaining constituents of the preparation may vary within considerable limits; a suitable proportion is 2 parts of milk powder to 1 part of cocoa. On mixing with water a nutrient beverage of agreeable taste is obtained which may be consumed preferably warm in winter, but also cold in summer.

The suspension or paste of milk powder could also be made with milk which has previously been subjected to an acid fermentation by addition of lactic acid bacteria, yoghurt ferment, kephir ferment, or the like.

It is not absolutely necessary for the milk to be used in the form of powder for the new process; it may also be added partly or completely in the form of a liquid concentrate to the acidified cocoa-containing liquid.

A process is already known for making cocoa milk in which the non-soluble constituents of the cocoa are maintained in suspension in the liquid by particular means for a limited time,—about 24 hours. The milk or the mixture of milk with the cocoa is heated under pressure for a definite period; the milk should not thereby exceed a certain natural degree of acidity. Chocolate milk prepared in other ways is also known. Moreover it has also already been proposed to homogenize such mixtures by means of the known devices. In contradistinction thereto, in the present process the mixture of cocoa, sugar and water made with addition of acid is heated until the constituents of the cocoa, more particularly the protein substances are broken down to such an extent that the insoluble constituents of the mixture no longer form solid sediment even on prolonged storage. First the preparation so obtained is mixed with the milk constituents and heated, and thereupon the acid content of the already prepared cocoa-sugar preparation is used to convert the protein substances of the milk into a state of swelling as well up to a certain extent.

What I claim is:

1. A process of making a cocoa preparation consisting in mixing cocoa in the form of a partially de-oiled cocoa powder in a sugar-containing liquid which is acidified by adding an acid of a low dissociation degree, then heating at boiling temperature and under moderate pressure, thereby converting the starch and the protein substances into soluble decomposition products and the non-soluble constituents of the cocoa converted into a state of swelling, and finally evaporating the obtained liquid wherein all constituents of the cocoa remain, said acidified aqueous liquid containing milk constituents.

2. A process of making a cocoa preparation consisting in mixing cocoa in the form of a partially deoiled cocoa powder in a sugar-containing liquid which is acidified by adding an acid of a low dissociation degree, then heating at boiling temperature and under moderate pressure, thereby converting the starch and the protein substances into soluble decomposition products and the non-soluble constituents of the cocoa converted into a state of swelling, and finally evaporating the obtained liquid wherein all constituents of the cocoa remain; said sugar containing liquid having an acidity of formic acid which lies between 0.05 and 0.15 of normal acidity and also contains milk constituents.

In testimony whereof I affix my signature.

HANS-ADALBERT SCHWEIGART.